US008613010B2

(12) United States Patent
Lim

(10) Patent No.: US 8,613,010 B2
(45) Date of Patent: Dec. 17, 2013

(54) BROADCASTING PROCESSING APPARATUS AND CONTROL METHOD OF THE SAME

(75) Inventor: Chea-il Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 381 days.

(21) Appl. No.: 12/564,361

(22) Filed: Sep. 22, 2009

(65) Prior Publication Data
US 2010/0269129 A1 Oct. 21, 2010

(30) Foreign Application Priority Data
Apr. 20, 2009 (KR) .................. 10-2009-0034061

(51) Int. Cl.
H04N 7/167 (2011.01)
H04N 7/16 (2011.01)

(52) U.S. Cl.
USPC ............... 725/31; 725/27; 725/25; 705/50; 705/51

(58) Field of Classification Search
USPC ................... 725/25–31; 705/50, 51
See application file for complete search history.

(56) References Cited

U.S. PATENT DOCUMENTS

| 5,659,366 | A  | * | 8/1997  | Kerman .................... | 725/34  |
| 5,900,913 | A  | * | 5/1999  | Tults ...................... | 348/468 |
| 6,226,793 | B1 | * | 5/2001  | Kwoh ...................... | 725/28  |
| 6,321,381 | B1 | * | 11/2001 | Yuen et al. ................ | 725/28  |
| 6,337,719 | B1 |   | 1/2002  | Cuccia                     |         |
| 6,373,904 | B1 | * | 4/2002  | Sakamoto et al. ........... | 375/316 |
| 6,584,199 | B1 | * | 6/2003  | Kim et al. ................ | 380/203 |
| 7,538,826 | B2 | * | 5/2009  | Englert ................... | 348/730 |
| 7,593,469 | B2 | * | 9/2009  | Williams et al. ........... | 375/257 |
| 2004/0093614 | A1 |   | 5/2004  | Sakurai et al.           |         |
| 2005/0044266 | A1 | * | 2/2005  | O'Neil .................... | 709/238 |
| 2005/0073617 | A1 | * | 4/2005  | Takahashi ................. | 348/838 |
| 2005/0102702 | A1 | * | 5/2005  | Candelore et al. .......... | 725/100 |
| 2005/0240977 | A1 | * | 10/2005 | Son ........................ | 725/111 |
| 2006/0004661 | A1 | * | 1/2006  | Bacon ..................... | 705/50  |
| 2007/0146552 | A1 | * | 6/2007  | Lim ....................... | 348/731 |
| 2008/0122988 | A1 | * | 5/2008  | Johnston .................. | 348/731 |
| 2008/0148315 | A1 | * | 6/2008  | Nishikawa et al. .......... | 725/39  |
| 2008/0226257 | A1 | * | 9/2008  | Asanuma et al. ............ | 386/83  |
| 2008/0260351 | A1 | * | 10/2008 | Li et al. ................. | 386/94  |
| 2009/0133049 | A1 | * | 5/2009  | Bradley ................... | 725/28  |

FOREIGN PATENT DOCUMENTS

| EP | 0895415 A2 | 2/1999 |
| EP | 1739967 A1 | 1/2007 |
| WO | 2008155681 A1 | 12/2008 |

OTHER PUBLICATIONS

"CI Plus Specificaiton. Content Security Extension to the Common Interface" V1.3 (Jan. 2011), pp. 1-316.*
European Office Action issued on May 11, 2011 in the corresponding European Patent Application No. 09172392.4.
Extended European Search Report dated Jul. 16, 2010 issued in counterpart application No. 09172392.4.
CI Plus LLP: "CI Plus Specification. Content Security Extensions to the Common Interface". Nov. 30, 2008. pp. 1-242, XP002590343.

* cited by examiner

Primary Examiner — An Son P Huynh
(74) Attorney, Agent, or Firm — Sughrue Mion, PLLC

(57) ABSTRACT

Disclosed are a broadcasting processing apparatus and a control method of the same. The broadcasting processing apparatus including: a broadcasting receiver which receives a broadcasting signal including contents and additional information about the contents; a condition access module which descrambles the contents if the contents have been scrambled; and a controller which controls the broadcasting receiver to receive the broadcasting signal during a power-off mode, and stores contents information about a shunning function that prevents the inputting of the contents to the condition access module among the received additional information.

25 Claims, 5 Drawing Sheets

FIG. 3

| CONTENTS INFORMATION | TYPES OF CONDITION ACCESS MODULE | WHETHER TO PERFORM SHUNNING FUNCTION |
|---|---|---|
| (1) protection_absent | - | Inactive |
| (2) protection_present Free_CI_mode "0" | - | Inactive |
| (3) protection_present Free_CI_mode "1" | CI | active |
| | CI+ | Inactive |
| (4) protection_present Free_CI_mode "1" Brand identifier not matched | - | active |
| (5) protection_present Free_CI_mode "1" Brand identifier matched | CI+ | Inactive |

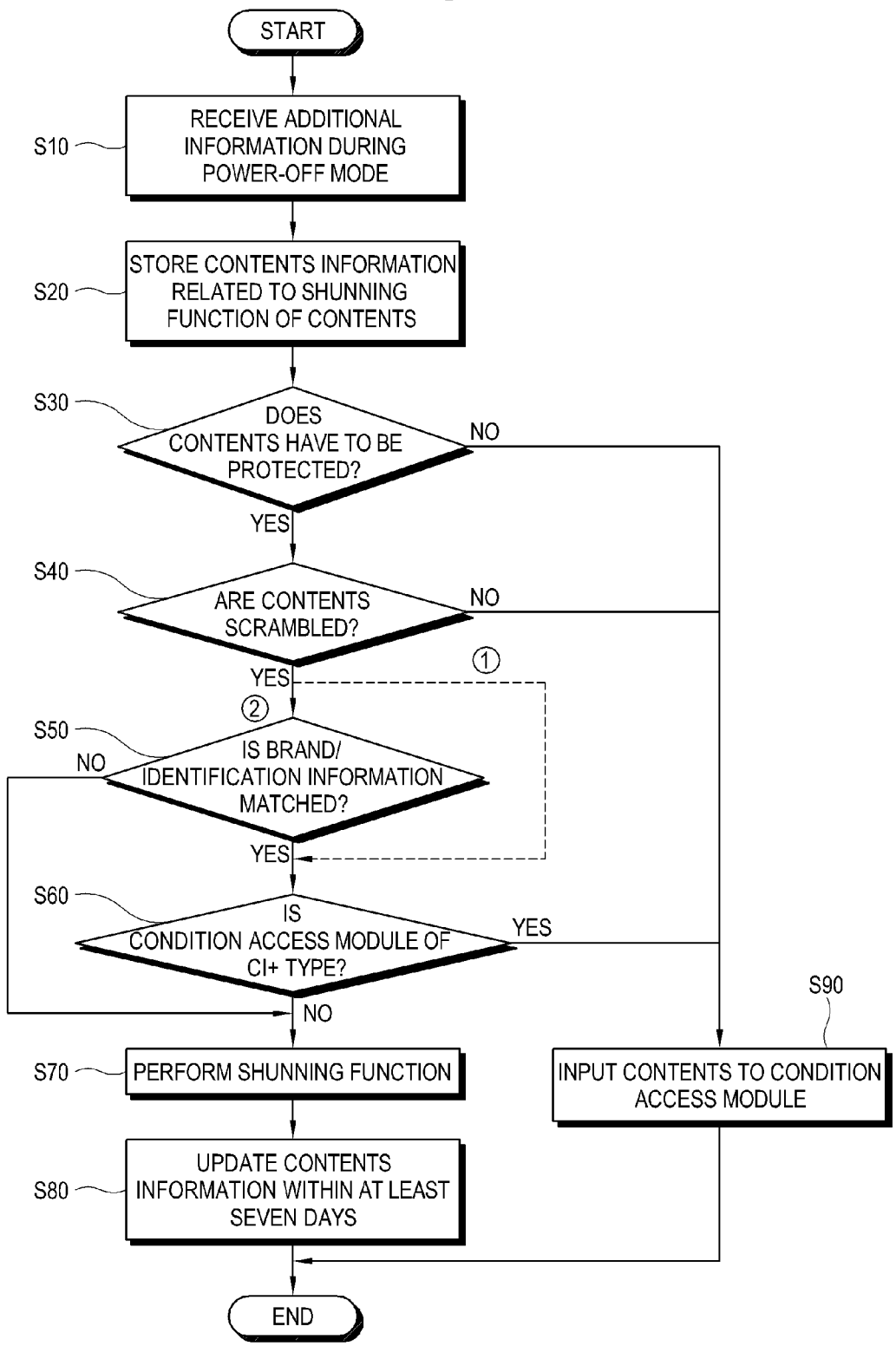

BROADCASTING PROCESSING APPARATUS AND CONTROL METHOD OF THE SAME

CROSS-REFERENCE TO RELATED APPLICATION

This application claims priority from Korean Patent Application No. 10-2009-0034061, filed on Apr. 20, 2009 in the Korean Intellectual Property Office, the disclosure of which is incorporated herein by reference.

BACKGROUND OF INVENTION

1. Field of Invention

Apparatuses and methods consistent with the present invention relate to a broadcasting processing apparatus and a control method of the same, and more particularly, a broadcasting apparatus having a shunning function and a control method of the same.

2. Description of the Related Art

In the case of paid channel contents, a video signal is scrambled and transmitted to a broadcasting processing apparatus so that it can be shown to only a subscriber. To show a user such contents, the broadcasting processing apparatus has to include a module capable of descrambling the scrambled subscriber. This module is called a condition access module (CAM). The CAM is mounted in the form of a personal computer memory card international association (PCMCIA), which is called a common interface (CI) module or a CI type module.

Meanwhile, a CI plus (CI+) module upgraded from the CI module has a shunning function. The shunning function prevents the inputting of contents received in the broadcasting processing apparatus to the condition access module in order to prevent use of a hacked condition access module, i.e., an illegally modified and misused condition access module.

SUMMARY OF THE INVENTION

Accordingly, an aspect of the present invention is to provide a broadcasting processing apparatus, which can conveniently and easily store reliable contents information for a shunning function, and a control method of the same.

Another aspect of the present invention is to provide a broadcasting processing apparatus, in which gaps in the received contents due to a shunning function can be decreased, and a control method of the same.

The foregoing and/or other aspects of the exemplary embodiments of the present invention can be achieved by providing a broadcasting processing apparatus including: a broadcasting receiver which receives a broadcasting signal including contents and additional information about the contents; a condition access module which descrambles the contents if the contents have been scrambled; and a controller which controls the broadcasting receiver to receive the broadcasting signal during a power-off mode, and stores contents information about a shunning function that prevents the inputting of the contents to the condition access module among the received additional information.

The controller may determine whether to perform the shunning function on the basis of authentication of the condition access module and the contents information stored whenever a channel is switched, and performs the shunning function according to determined results.

The controller may update the contents information within at least seven days.

The contents information may include protection information about whether to protect the contents, and the controller may not perform the shunning function if the protection information is not to protect the contents.

The contents information may include scramble information about whether or not the contents are scrambled, and the controller may not perform the shunning function if the scramble information indicates that the contents are not scrambled.

The contents information may include at least one of brand information and identification information of the condition access module, and the controller may perform the shunning function if at least one of the received brand information and identification information is not matched with at least one of brand information and identification information of the condition access module.

The condition access module may include either of a common interface (CI) type or a CI plus (CI+) type, and the controller may determine that the condition access module is not authenticated if the condition access module is the CI type, and performs the shunning function.

An exemplary embodiment of the broadcasting processing apparatus may further include a signal processor which processes the contents, and if the controller does not perform the shunning function, the contents not scrambled may bypass the condition access module and are input to the signal processor, but the contents scrambled may be descrambled by the condition access module and input to the signal processor.

An exemplary embodiment of the broadcasting processing apparatus may further include a display unit which displays the contents.

Another aspect of the present invention may be achieved by providing a method of controlling a broadcasting processing apparatus including a broadcasting receiver which receives a broadcasting signal including contents and additional information about the contents, and a condition access module which descrambles the contents if the contents have been scrambled, the method including: receiving the additional information during a power-off mode; and storing contents information about a shunning function that prevents the inputting of the contents to the condition access module among the received additional information.

In another exemplary embodiment of the invention, there is a broadcasting processing apparatus including: a receiver which receives a broadcast signal comprising contents and contents information; a descrambler which is operable to descramble the contents if the contents are scrambled; and a controller which controls the broadcasting receiver to receive the broadcast signal during a power-off mode, stores the contents information, and is operable in a first mode to prevent the descrambler from receiving the contents based on the contents information.

BRIEF DESCRIPTION OF THE DRAWINGS

The above and/or other aspects of the exemplary embodiments of the present invention will become apparent and more readily appreciated from the following description of the exemplary embodiments, taken in conjunction with the accompanying drawings, in which:

FIG. 3 shows an information table for determining whether to perform the shunning function of the broadcasting processing apparatus of FIG. 1; and FIG. 4 is a control flowchart for explaining a control method of the broadcasting processing apparatus of FIG. 1.

DETAILED DESCRIPTION OF EXEMPLARY EMBODIMENTS OF THE INVENTION

Figure 1:
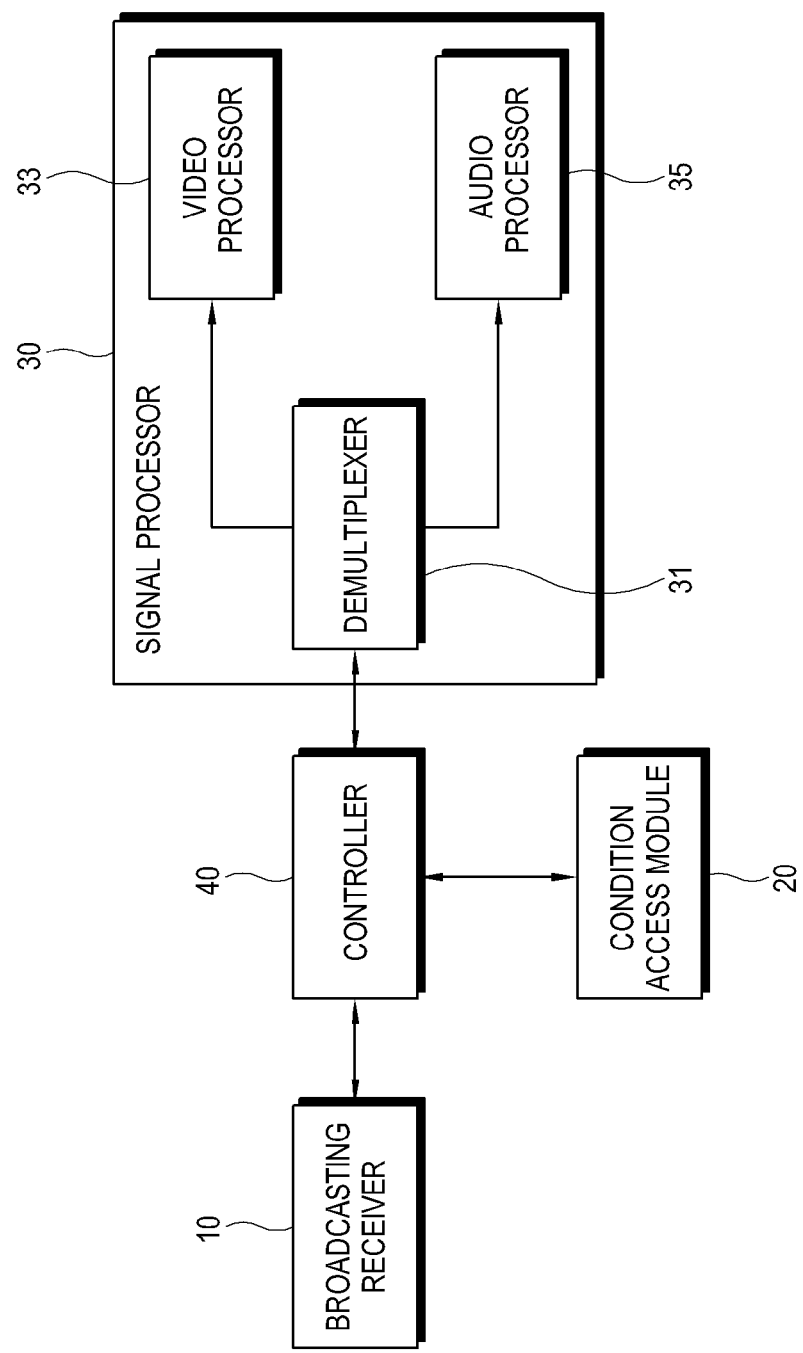
FIG. 1 is a control block diagram of a broadcasting processing apparatus according to an exemplary embodiment of the present invention.

Below, exemplary embodiments of the present invention will be described in detail with reference to accompanying drawings so as to be easily realized by a person having ordinary knowledge in the art. Exemplary embodiments of the present invention may be embodied in various forms without being limited to the embodiments set forth herein. Descriptions of well-known parts are omitted for clarity, and like reference numerals refer to like elements throughout.

FIG. 1 is a control block diagram of a broadcasting processing apparatus according to an exemplary embodiment of the present invention. The broadcasting processing apparatus includes a broadcasting receiver 10, a condition access module 20, a signal processor 30 and a controller 40 for controlling the broadcasting receiver 10, the condition access module 20, and the signal processor 30. The broadcasting processing apparatus in this exemplary embodiment may be achieved by a set-top box capable of receiving a broadcasting signal. Alternatively, the broadcasting processing apparatus may be achieved by a television including a display unit in another exemplary embodiment.

The broadcasting receiver 10 includes a tuner to receive various contents in a broadcasting signal, a network interface capable of receiving a broadcasting signal through a network, etc. Besides contents that become an object for viewing, the broadcasting signal includes diverse additional information. The contents include free contents anyone can view, and paid contents allowed only for a paid subscriber. Such paid contents are scrambled and are not to be shown to a non-subscriber or a non-paying subscriber. The additional information may be received in the form of a table such as system information, a service description table, etc. and may include diverse information about contents.

The condition access module 20 descrambles the scrambled contents. The condition access module 20 may be mounted in the form of a personal computer memory card international association (PCMCIA), and include a common interface (CI) type or a CI plus (CI+) type. In one exemplary embodiment, the condition access module 20 is a descrambler.

In the case where a hacking module that illegally descrambles the scrambled contents is installed in the broadcasting processing apparatus, it is possible for a user, if not the subscriber, to view the paid contents. In the case of the CI+ type, the scrambled contents are descrambled and then modulated into a certain form before being output to the signal processor 30, thereby preventing the use of the hacking module. Further, the CI+ type supports a shunning function to input only contents satisfying a certain condition to the condition access module 20 but otherwise prevent contents from being input to the condition access module 20, thereby protecting the contents. More detailed descriptions of the shunning function will be described later.

The signal processor 30 processes an input broadcasting signal and provides it to the display unit (not shown) or the controller 40. As shown therein, the signal processor 30 includes a demultiplexer 31, a video processor 33, and an audio processor 35. Also, the signal processor 30 may include a demodulator (not shown) to demodulate and correct the broadcasting signal. The demultiplexer 31 divides the broadcasting signal into additional information, a video signal and an audio signal, and provides them as a bit stream to the controller 40, the video processor 33 and the audio processor 35.

The video processor 33 includes a video decoder (not shown) for decoding the video signal from the demultiplexer 31, and a scaler for converting the decoded video signal to have a vertical frequency, a resolution, an aspect ratio, etc. adapted to an format standard of the display unit (not shown). Also, the contents descrambled by the condition access module 20 are input to and processed by the video processor 33.

The audio processor 35 processes an audio signal of the contents and sends it to an audio output unit such as a speaker (not shown).

Figure 2A:
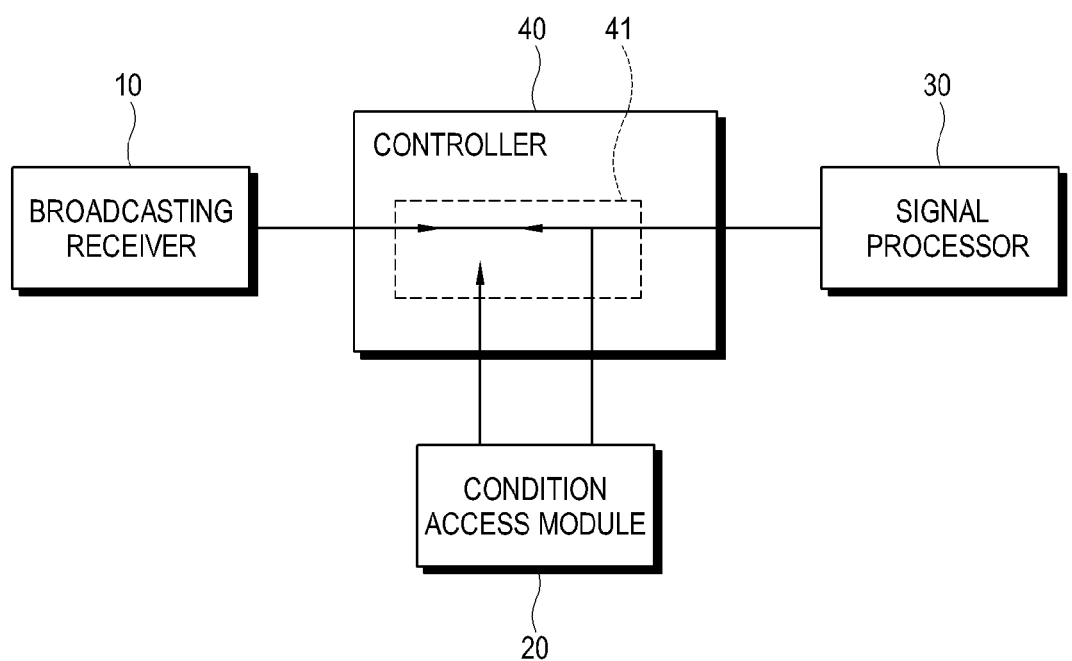
FIGS. 2A and 2B are block diagrams for explaining a shunning function of the broadcasting processing apparatus of FIG. 1.
Figure 2B:
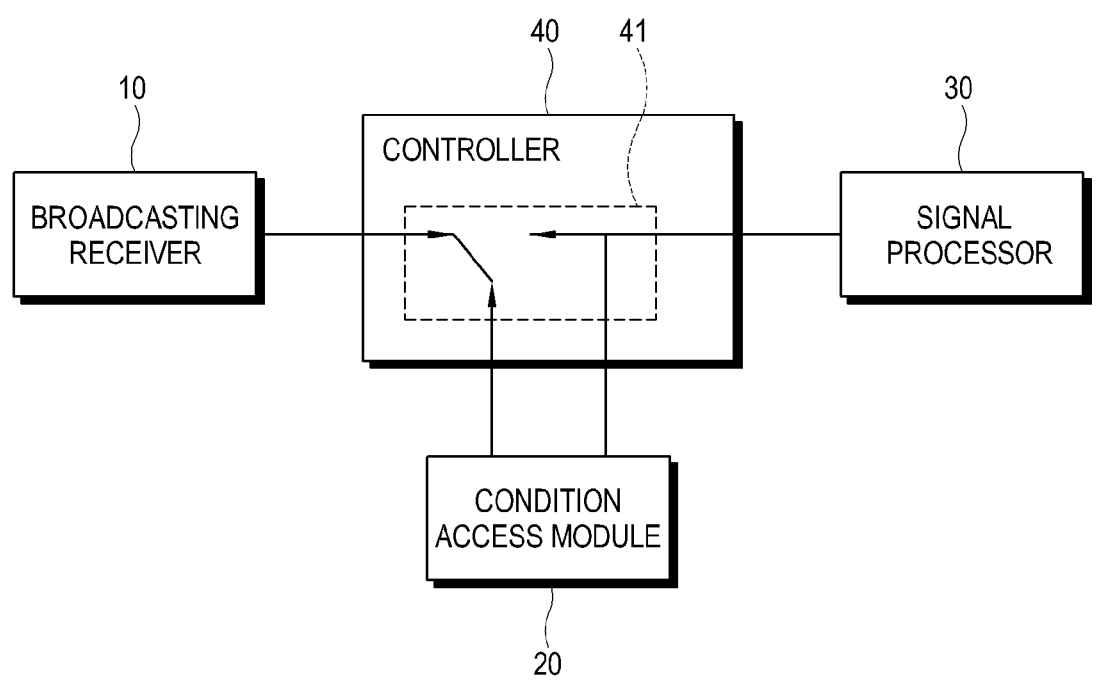

The controller 40 controls the broadcasting receiver 10 to receive a broadcasting signal during a power-off mode, and stores contents information related to the shunning function among the received additional information. As described above, the shunning function prevents the inputting of contents to the condition access module 20. FIGS. 2A and 2B are block diagrams for explaining a shunning function of the broadcasting processing apparatus of FIG. 1. As shown therein, the controller 40 includes a switching unit 41 to determine flow of the contents. FIG. 2A shows that the shunning function is performed. When the shunning function is running, the scrambled contents are not descrambled, so that it cannot be displayed on the display unit. On the other hand, the contents not scrambled are processed by the signal processor 30, so that it can be displayed on the display unit. In this embodiment, a default state is that the contents received in the broadcasting receiver 10 are input to the signal processor 30, i.e., the shunning function is performed. In this exemplary embodiment, if the shunning function is not performed, the contents scrambled are descrambled and input to the signal processor 30 as shown in FIG. 2B, but the contents not scrambled bypasses the condition access module 20 and are input to the signal processor 30.

The controller 40 determines whether to perform the shunning function according to channels, in which the determination is implemented on the basis of the additional information involved in the broadcasting signal. The contents information related to the shunning function may include at least one of protection information about whether to protect the contents, scramble information about whether the contents are scrambled or not, and brand and identification information about the condition access module. The contents information is an example of information received in the broadcasting processing apparatus from the outside, which is not fixed information but information variable according to request or selection of a contents provider.

If whether to perform the shunning function is determined whenever a channel is switched, it takes time to demodulate diverse contents information from the additional information, resulting in delaying a channel switch. In order to more quickly determine whether to perform the shunning function when a channel is switched, the controller 40 in this embodiment receives a broadcasting signal during the power-off mode where minimum power is supplied to the broadcasting processing apparatus, and stores the contents information according to channels. During the power-off mode, electric power is not supplied to respective elements for receiving a broadcasting signal and processing video and audio signals, but the minimum power is supplied for detecting a power-on signal input by a user. For example, a television does not display a broadcasting signal but receives only alternating current (AC) power during the power-off mode. If the contents information is stored during not the power-off mode but viewing, it is inconvenient to implement an auto channel search and it is impossible to watch contents while storing the contents information. According to this exemplary embodiment of the present invention, the content information is stored during the power-off mode where a user does not use the broadcasting processing apparatus, so that viewing environment for a user can be optimized and it can be quickly determined whether to perform the shunning function.

The controller 40 may update the contents information by a predetermined period to have reliable stored contents information. According to a CI+ standard, seven days are provided as the maximum period for reliable content information. In this case, the controller 40 updates the contents information in the power-off mode within seven days. The controller 40 may store the contents information in a separate storage unit or the inside thereof.

In this exemplary embodiment, the signal processor 30 and the controller 40 are illustrated as separate blocks for convenience of description, but not limited thereto. Alternatively, the controller 40 and the signal processor 30 may be provided as a single processing block such as a single chip.

FIG. 3 shows an information table for determining whether to perform the shunning function in the broadcasting processing apparatus according to this exemplary embodiment. The controller 40 determines whether to perform the shunning function on the basis of the stored contents information and authentication of the condition access module 20 whenever a channel is switched, and performs the shunning function according to determination results. The controller 40 determines a type of the condition access module 20, thereby determining whether the condition access module 20 is authenticated. In other words, if the condition access module 20 is the CI type, it is determined that the condition access module 20 is not authenticated. On the other hand, if the condition access module 20 is the CI+ type, it is regarded that the installation of the hacking module is excluded, and thus it is determined that the condition access module 20 is authenticated. The authentication of the condition access module 20 may be determined whenever the shunning function is performed or by a predetermined period.

To begin with, in the first case (1) where protection information ('protection_absent' or 'protection_present') about whether to protect contents is 'protection_absect' in which the contents are not protected, the controller 40 does not perform the shunning function regardless of the types of the condition access module 20 (inactive). Because the protection is not needed, there is no problem even through the contents are input to the hacking module. In this case, the contents may be a broadcasting signal corresponding to free contents.

In the second case (2) where the protection information is 'protection_present' but the scramble information ('Free_CI_ mode "0"' or 'Free_CI_mode "1"') about whether the contents are scrambled or not is 'Free_CI_mode "0"' in which the contents are not scrambled, the controller 40 does not perform the shunning function regardless of the types of the condition access module 20 (inactive). Here, because the contents not scrambled bypass the condition access module 20, there is no problem even though the condition access module is the hacking module.

On the other hand, if the scramble information is 'Free_CI_ mode "1"' in which the contents are scrambled, the controller 40 ascertains the types of the condition access module 20 and determines whether the condition access module 20 is authenticated. If the condition access module 20 is the CI type, it is determined that the condition access module 20 is not authenticated, and thus the shunning function is performed to protect the contents (active). If the condition access module 20 is the CI+ type, the shunning function is disabled (inactive), thereby descrambling the contents.

In the fourth case (4), the contents information includes at least one of the brand information and the identification information about the condition access module 20. If the contents provider wants to control the contents to be descrambled according to conditions of certain brand or identification information about the condition access module 20, this information may be included in the additional information. For example, if the content provider wants to control the contents to be or not to be descrambled with regard to only a certain brand, he/she may insert a command code for ascertaining the brand or identification information of the condition access module 20 in the additional information. Then, the controller 40 may ascertain the brand or identification information of the condition access module 20 on the basis of the command code. If at least one of the received brand information and identification information is not matched with at least one of the brand information and the identification information of the condition access module 20 (Brand identifier not matched), the controller 40 determines that the condition access module 20 is not authenticated, regardless of the types of the condition access module 20, and performs the shunning function to protect the contents (active).

In the fifth case (5) where the received brand information or identification information is matched with the brand or identification information of the condition access module 20 (Brand identifier matched), the controller 40 disables the shunning function if the condition access module 20 is the CI+ type (inactive), thereby descrambling the contents.

The foregoing cases are examples for determining whether to perform the shunning function, and the controller 40 determines whether to perform the shunning function according to the received contents information.

FIG. 4 is a control flowchart for explaining a control method of the broadcasting processing apparatus of FIG. 1. Referring to FIG. 4, the shunning function is stored and performed as follows.

The controller 40 receives the additional information during the power-off mode when a user is not viewing, at operation S10, and stores the contents information related to the shunning function for the contents among the additional information at operation S20. Since reliable contents information is stored, it is possible to minimize operations of switching to the default state in order to determine whether to perform the shunning function whenever a channel is changed. For example, if the contents information is not stored, the contents information has to be grasped every time when the channel is switched. To this end, the switching unit 41 has to be at each time, switched to the default state. On the other hand, if the contents information has been stored, the switching unit 41 can be kept in a certain state when the shunning function is continuously performed or not performed, so that switching unit 41, thereby minimizing gaps in content reception due to the switch of the switching unit 41.

The controller 40 obtains the contents information and determines whether to perform the shunning function according to various conditions.

At operation S30, the protection information about whether to protect the contents is determined. If there is no need to protect the contents, the contents are input to the condition access module 20 without performing the shunning function at operation S90.

If there is a need of protecting the contents, the controller 40 determines whether the contents are scrambled or not at operation S40, and inputs the contents to the condition access module 20 without performing the shunning function at operation S90 if the contents are not scrambled.

If the contents are scrambled, it may be determined whether the condition access module is the CI+ type in a first case ① at operation S60, and the brand information or the identification information of the condition access module 20 may be determined in a second case ② at operation S50.

The first case ① indicates that the contents information does not include the brand information or the identification information, and the second case ② indicates that the contents information includes the brand information or the identification information.

In the second case ②, if the received contents information is not matched with the brand information or the identification information of the condition access module 20, the controller 40 determines whether the condition access module 20 is authenticated or not at operation S60.

If the condition access module 20 is the CI type regardless of the first case ① or the second case ②, the shunning function is performed at operation S70. On the other hand, if the condition access module 20 is the CI+ type, the shunning function is not performed at operation S90.

At operation S80, the controller 40 updates the contents information for determining whether to perform the shunning function within at least seven days.

As described above, exemplary embodiments of the present invention provides a broadcasting processing apparatus, which can conveniently and easily store reliable contents information for a shunning function, and a control method of the same.

Also, exemplary embodiments of the present invention provides a broadcasting processing apparatus, in which gaps in the received contents due to a shunning function can be decreased, and a control method of the same.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A broadcasting processing apparatus comprising:
a broadcasting receiver which receives a broadcasting signal comprising contents and additional information about the contents;
a condition access module which descrambles the contents if the contents have been scrambled; and
a controller which controls the broadcasting receiver to receive the broadcasting signal during a power-off mode, and stores contents information about a shunning function among the received additional information according to channels, wherein the shunning function prevents an inputting of the contents to the condition access module,
wherein the power-off mode has a power level that is below a first minimum power level required for displaying the broadcasting signal and is equal to a second minimum power level required for detecting a power-on signal and receiving the broadcasting signal, and
wherein the controller determines, whenever a channel is switched, whether to perform the shunning function based on an authentication of the condition access module and the stored contents information, as determined results, minimizing a delay in channel switching and performs the shunning function according to the determined results.

2. The broadcasting processing apparatus according to claim 1, wherein the controller updates the contents information within at least seven days.

3. The broadcasting processing apparatus according to claim 1, wherein the contents information comprises protection information about whether to protect the contents, and
the controller does not perform the shunning function if the protection information is not to protect the contents.

4. The broadcasting processing apparatus according to claim 1, wherein the contents information comprises scramble information about whether or not the contents are scrambled, and
the controller does not perform the shunning function if the scramble information indicates that the contents are not scrambled.

5. The broadcasting processing apparatus according to claim 1, wherein the contents information comprises at least one of brand information and identification information of the condition access module, and
the controller performs the shunning function if the at least one of the received brand information and the received identification information does not match with at least one of actual brand information and actual identification information of the condition access module.

6. The broadcasting processing apparatus according to claim 1, wherein the condition access module comprises either of a common interface (CI) type or a CI plus (CI+) type, and
the controller determines that the condition access module is not authenticated if the condition access module is the CI type, and performs the shunning function.

7. The broadcasting processing apparatus according to claim 1, further comprising a signal processor which processes the contents, and
if the controller does not perform the shunning function, the contents not scrambled bypasses the condition access module and are input to the signal processor, and the contents scrambled are descrambled by the condition access module and input to the signal processor.

8. The broadcasting processing apparatus according to claim 1, further comprising a display unit which displays the contents.

9. The broadcasting processing apparatus of claim 1, wherein a signal processor processes the broadcasting signal and divides the broadcasting signal into the received additional information for the controller, a video signal for a video processor, and an audio signal for an audio processor.

10. The broadcasting processing apparatus of claim 9, wherein the video processor decodes the video signal, and scales the decoded video signal to have a vertical frequency, a resolution, and an aspect ratio adapted to a standard format of a display unit.

11. The broadcasting processing apparatus of claim 9, wherein the audio processor processes the audio signal and sends the processed audio signal to an audio output unit.

12. The broadcasting processing apparatus of claim 1, wherein the controller performs the shunning function if the contents information indicates that a protection information protects the contents, a scramble information indicates that the contents are scrambled, and the condition access module comprises a common interface (CI) type.

13. The broadcasting processing apparatus of claim 1, wherein the controller does not perform the shunning function if the contents information indicates that a protection information protects the contents, a scramble information indicates that the contents are scrambled, and the condition access module comprises a common interface plus (CI+) type.

14. The broadcasting processing apparatus of claim 1, wherein the controller performs the shunning function if the contents information indicates that a protection information protects the contents, a scramble information indicates that the contents are scrambled, and at least one of the received brand information does not match with at least one of actual brand information of the condition access module.

15. The broadcasting processing apparatus of claim 1, wherein the controller does not perform the shunning function if the contents information indicates that a protection information protects the contents, a scramble information indicates that the contents are scrambled, and at least one of the received brand information does match with at least one of actual brand information of the condition access module.

16. The broadcasting processing apparatus of claim 1, wherein the broadcasting signal is an analog signal.

17. A method of controlling a broadcasting processing apparatus including a broadcasting receiver which receives a broadcasting signal comprising contents and additional information about the contents, and a condition access module which descrambles the contents if the contents have been scrambled, the method comprising:
receiving the additional information during a power-off mode;
storing contents information about a shunning function among the received additional information according to channels, wherein the shunning function prevents an inputting of the contents to the condition access module,
determining whether to perform the shunning function based on an authentication of the condition access module and the stored contents information, whenever a channel is switched, as determined results, minimizing a delay in channel switching; and
performing the shunning function according to the determined results,
wherein the power-off mode has a power level that is below a first minimum power level required for displaying the broadcasting signal and is equal to a second minimum power level required for detecting a power-on signal and receiving the broadcasting signal.

18. The method according to claim 17, wherein the storing the contents information comprises updating the contents information within at least seven days.

19. The method according to claim 17, wherein the contents information comprises protection information about whether to protect the contents, and
the determining whether to perform the shunning function comprises determining not to perform the shunning function if the protection information is not to protect the contents.

20. The method according to claim 17, wherein the contents information comprises scramble information about whether or not the contents are scrambled, and
the determining whether to perform the shunning function comprises determining not to perform the shunning function if the scramble information indicates that the contents are not scrambled.

21. The method according to claim 17, wherein the contents information comprises at least one of brand information and identification information of the condition access module, and
the determining whether to perform the shunning function comprises determining to perform the shunning function if the at least one of the received brand information and the received identification information does not match with at least one of actual brand information and actual identification information of the condition access module.

22. The method according to claim 17, wherein the condition access module comprises either of a common interface (CI) type or a CI plus (CI+) type, and
the determining whether to perform the shunning function comprises determining that the condition access module is not authenticated if the condition access module is the CI type.

23. The method according to claim 17, wherein the broadcasting processing apparatus further comprises a signal processor which processes the contents, and
if the controller does not perform the shunning function, the contents not scrambled bypasses the condition access module and are input to the signal processor, and the contents scrambled are descrambled by the condition access module and input to the signal processor.

24. A broadcasting processing apparatus comprising:
a receiver which receives a broadcast signal comprising contents and contents information;
a descrambler which is operable to descramble the contents if the contents are scrambled; and
a controller which controls the broadcasting receiver to receive the broadcast signal during a power-off mode, stores the contents information according to channels, and is operable in a first mode to prevent the descrambler from receiving the contents based on the contents information,
wherein the power-off mode has a power level that is below a first minimum power level required for displaying the broadcasting signal and is equal to a second minimum power level required for detecting a power-on signal and receiving the broadcasting signal, and
wherein whenever a channel is switched, the first mode is determined by the contents information, minimizing a delay in channel switching, the contents information including information for authentication with the descrambler or information regarding protection of the contents.

25. The broadcast processing apparatus of claim 24, wherein in the first mode, the contents are scrambled and are directly outputted to a signal processor, and in a second mode, the contents are scrambled and are descrambled by the descrambler and the descrambled contents are received by the signal processor.

* * * * *